US012754819B1

(12) United States Patent
Sengupta et al.

(10) Patent No.: US 12,754,819 B1
(45) Date of Patent: Oct. 6, 2026

(54) COMPOSITIONAL CODE ANALYSIS

(71) Applicant: Amazon Technologies, Inc., Seattle, WA (US)

(72) Inventors: Aritra Sengupta, Mountain View, CA (US); Michael Emmi, Johnson City, NY (US); Liana Sorina Hadarean, Sunnyvale, CA (US); Martin Schaef, Queens, NY (US); Nicolas Leandro Rosner, New York, NY (US); Lee Pike, Portland, OR (US); Willem Conradie Visser, Los Gatos, CA (US); Peixuan Li, State College, PA (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 17/952,805

(22) Filed: Sep. 26, 2022

(51) Int. Cl.
*G06F 11/3604* (2025.01)

(52) U.S. Cl.
CPC ................................ *G06F 11/3604* (2013.01)

(58) Field of Classification Search
None
See application file for complete search history.

(56) References Cited

U.S. PATENT DOCUMENTS 7,055,065 B2 * 5/2006 Farchi ................. G06F 11/3676 717/124
7,490,317 B1 * 2/2009 Hahn ........................ G06F 8/75 717/121
11,941,379 B1 * 3/2024 Laverdière-Papineau .................. G06F 11/3616
2018/0246803 A1 * 8/2018 Zhang ................. G06F 11/3688

* cited by examiner

*Primary Examiner* — Qamrun Nahar
*Assistant Examiner* — Mark A Gooray
(74) *Attorney, Agent, or Firm* — Davis Wright Tremaine LLP

(57) ABSTRACT

A system generates one or more finite state models based on one or more programming policies. The system analyzes a first element of source code by applying the one or more finite state models to the first element, and stores a summary of the analysis. The system analyzes a second element of the source code, where the second element references the first element, using the finite state models and the stored summary. The system generates a report to indicate the source code's conformity to the programming policies based on the analysis of the first and second elements.

19 Claims, 8 Drawing Sheets

400

```
functionOne(InputStream input) {
        Factory fac = new Factory();                    // line 2
        fac.setProperty("disallowed");                  // line 3
        Builder builder = functionTwo(fac, input)       // line 4 (error)
}

functionTwo(Factory fac, InputStream input) {
        Builder build = new Builder()                   // line 7
        build.setFactory(fac);                          // line 8
        build.parse(input);                             // line 9
        return builder;
}
```

source code 402

FIG. 4

COMPOSITIONAL CODE ANALYSIS

BACKGROUND

The identification of defects in software program remains a challenging problem. Some techniques for identifying such defects involve analyzing the source code on which a program is based. However, the speed and efficiency of these techniques may be improved.

BRIEF DESCRIPTION OF THE DRAWINGS

Various techniques will be described with reference to the drawings, in which:

FIG. 4 illustrates source code for compositional analysis, in accordance with at least one embodiment;

DETAILED DESCRIPTION

Figure 1:
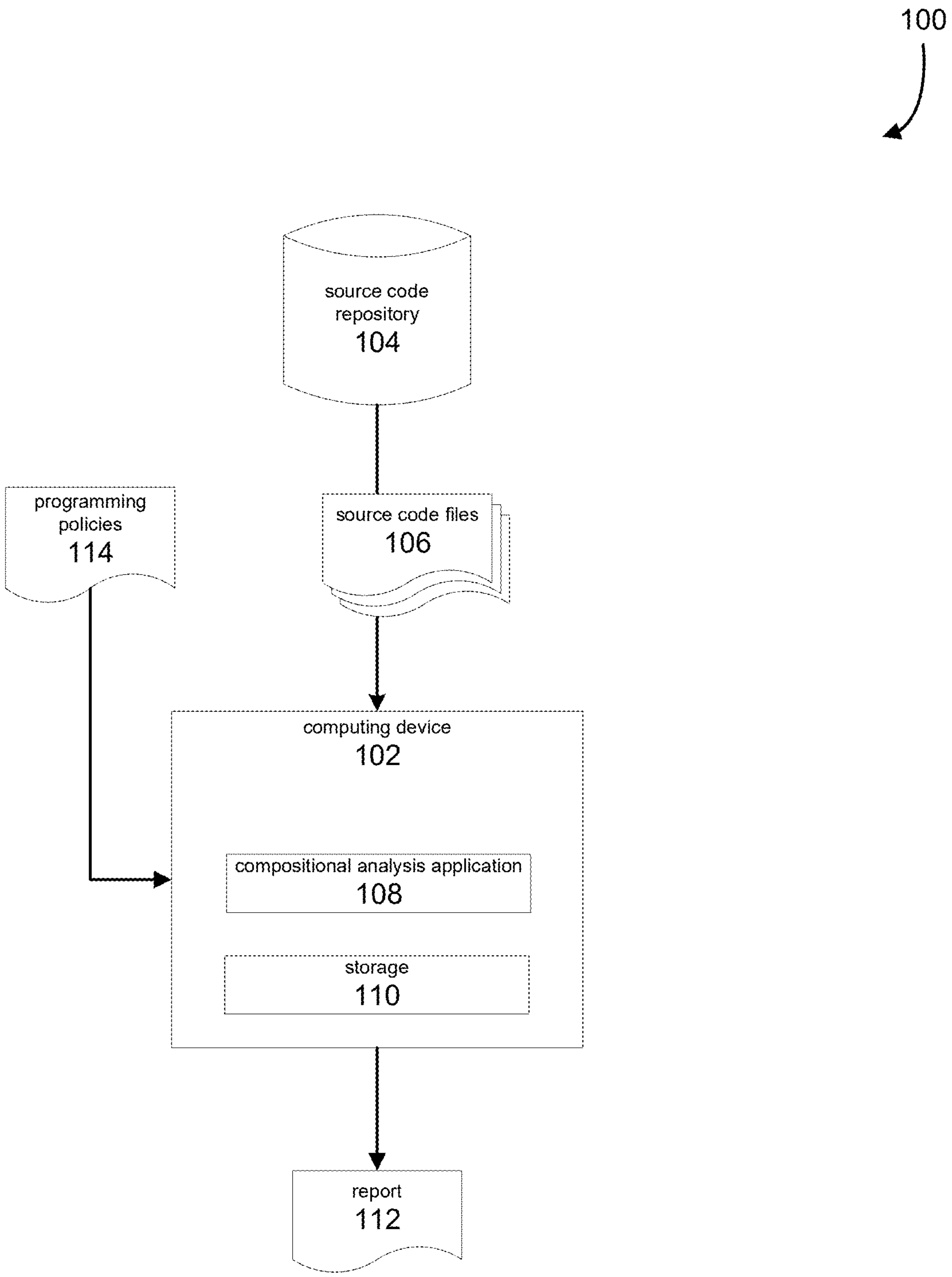
FIG. 1 illustrates a system for analyzing source code using compositional analysis, in accordance with at least one embodiment.

Applications to detect bugs in a software program, without executing the target program, are sometimes referred to as static analysis tools. Some of these tools identify bugs, and other issues, by searching and analyzing the source code of the program for property violations that are expressed as a specification. The specification may indicate one or more programming rules, and these can be converted to a finite state model. However, depending on how the models are used, these techniques may not scale well as the size and complexity of the target program increases. However, a compositional analysis technique, as described herein, may scale well with size and complexity, as well as facilitate incremental analysis—for example by facilitating the incremental impact of a change to a program, rather than requiring an entire program to be reanalyzed when only a subset of the program has changed. Instead of analyzing a subject in its entirety every time it updated (, e.g. a commit to a code repository), compositional analysis facilitates an analysis that may be limited to selected parts of the program. In addition, compositional analysis facilitates parallelizing program analysis, for example, analyzing a part of the program in a thread of execution in parallel with other parts. Compositional analysis may also facilitate storing intermediate or tentative results for an analysis in a repository for later usage.

As described in more detail herein, a finite state model may be used to represent rules for analyzing source code properties. A finite state model defines states and transitions that are guarded by conditions that reflect various points in a program's source code. A property finite state model, or an initial state of a finite state model, may be instantiated when certain expressions or lines of code are identified in an analysis, and state transitions in the model may be noted in response to identifying other expressions or lines of code.

In traditional whole-program analysis tools, certain methods may be pre-defined as entry-points, methods where the analysis starts. In a whole-program analysis tool, the analysis may start at the program's main( ) function and analyze the program in top-down, sequential manner. In contrast, compositional analysis examines the program's source code bottom-up. Each function is analyzed independently, its effects are summarized, and the summaries of these effects are applied at different program points where these functions are called.

In a further aspect of the example, a compositional analysis system generates modular finite state summaries. These are summaries of functions that enable examination of the function's compliance with programming policies. The summaries, moreover, may be generated by the system independently of the context(s) in which the function is called, and can reflect speculative state transitions when a non-speculative transition cannot be identified without knowing the calling context. These speculative transitions can be made non-speculative once the calling context is known.

In a further aspect of the example, compositional analysis is performed using parallelism. The call graph of a program may be analyzed substantially in bottom-up fashion, potentially analyzing nodes of the call graph in parallel wherever there are no interdependencies between nodes and the respective nodes can be processed independently of each other.

In a further aspect of the example, compositional analysis is performed incrementally. Analysis results, such as the aforementioned summaries, can be cached at a function level. This can significantly speed program analysis, particularly for large programs. For example, a submission to a source code repository might change ten lines (or fewer) of code. While some top-down techniques might require the entire program to be reanalyzed, embodiments of compositional analysis as described herein may analyze a program in bottom-up fashion, starting from a point in the program's call graph that corresponds to the source code that has been changed. As the compositional analysis application moves up the call tree or call graph, it may analyze only those branches that have been affected by the change. In some cases, embodiments take advantage of intermediate results of the analysis, such summaries, that are stored in a repository or other location. This facilitates re-use of prior analysis results for those portions of the code that have not changed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a system for analyzing source code using compositional analysis, in accordance with at least one embodiment. In the example system 100, a computing device 102 comprises at least one processor and memory that stores instructions that, in response to execution by the processor(s), cause the system 100 to analyze source code using compositional analysis.

The computing device 102 may obtain source code from any of a variety of sources, which may include but is not necessarily limited to a source code repository 104. In at least one embodiment, a source code repository 104 comprises a computing device and an application that stores and retrieves source code files 106 from one or more storage devices associated with the computing device. The application may support version control and other similar features to manage changes to source code. For example, the application may support storage and retrieval of specific versions of the source code files 106, and may also support the storage and retrieval of sets of files associated with a particular version of a program. These sets of files may be referred to as version sets.

Source code includes textual data written in a programming language. Examples include, but are not limited to, programming languages such as JAVA, JAVASCRIPT, C/C++, C#, Python, and SQL. The source code files 106 include the source code to be analyzed by a compositional analysis application 108. Note that in addition to source code, other code formats may be analyzed using techniques similar to those described herein. For example, intermediate code, interpreted code, or compiled code may be analyzed compositionally. Accordingly, although most of the example embodiments described herein are described using source code, similar techniques may be used with other code formats, including but not necessarily limited to intermediate code, interpretable code, or compiled code. These formats may be stored, in at least some cases, in files such as object files, library files, or program files.

The computing device 102 executes the compositional analysis application 108 to determine whether one or more of the source code files 106 complies with programming policies 114. A programming policy includes various rules, tests, conditions, or guidelines for source code. These may be used to identify potential errors in the source code, as well as other conditions such as non-compliance with various standards or practices. A programming policy may comprise textual or binary data indicative of these rules, tests, conditions, or guidelines. Examples of a programming policy may include, but are not limited to, restrictions on parameter values, requirements that a variable be initialized, requirements that certain methods be called in a specific order, requirements to adhere to a particular format or style, and so on.

The compositional analysis program 108 may comprise processor-executable functions that, when executed by one or more processors of the computing device 102, causes it to determine whether one or more of the source code files 106 complies with programming policies 114. To perform the analysis, the computing device 102 may generate finite state models based on the programming policies 114, evaluate elements of the source code files 106 using the finite state models, and generating a report 112 to indicate conformance of the source code files 106 with the programming policies 114. Generating the report 112 can comprise creating textual representations of conformance, creating graphical representations of conformance, generating statistical representations of conformance, and so on. As used herein, conformance can include violations of programming policy and/or compliance with programming policy. Conformance can also include inferences and/or deductions drawn from violations or compliance with programming policy.

Conformance with the programming policies 114 may refer to adherence and/or non-adherence of the analyzed source code to the programming policies 114. The report 112 may comprise a textual or graphical representation of conformance. In at least one embodiment, the report 112 includes textual data that indicates where non-conformance with one or more of the programming policies 114 was found, for example by indicating a filename and line number of source code found to be non-conforming.

A finite state model, which may include finite state machines and other finite automata, is a computational model that is used to simulate transitions between a finite set of states. A finite state model may comprise a list or set of possible states and a set of rules or conditions that trigger transitions between states. For example, a finite state model might be used to test that a function "f1" always be called with its first parameter set to true, i.e. as "f1 ("true")." A finite state model to test for conformance with this rule might therefore comprise tree states, including an initial state $S_1$, a state $S_2$ set when the first parameter is "true," and a state $S_3$ set when the first parameter is anything other than "true."

The compositional analysis application 108 may analyze elements of the source code that starts with elements lower in a call chain and proceeds upwards. For example, if a function $F_1$ calls $F_2$, the compositional analysis application 108 may first analyze $F_2$, and then analyze $F_1$. Summaries of the analysis for each stage may be stored in storage 110, or using any other suitable storage device or storage service. In some cases, the summaries may be stored in a source code repository, such as the source code repository 104 depicted in FIG. 1. The stored summary may include data that describes a complete or partially complete analysis of the element of source code. For example, a summary might include data indicating the ending state of a finite state model in the case of a completed analysis, or include data indicating one or more speculative end states in the case of an incomplete, or partial, analysis. In some cases, a stored summary may relate to higher-level components, such as for all of the functions defined in a source code file, in a set of files, in a library or program, and so forth.

The compositional analysis program 108 may use stored summaries in subsequent stages of analysis. For example, referring to the example of functions $F_1$ and $F_2$, the summary of $F_2$ may be used to analyze $F_1$, and to finalize any speculative determinations regarding $F_2$'s compliance with the programming policies 114. The summary of $F_2$ might also be used for other functions that invoke $F_2$, or for subsequent versions of $F_1$. For example, if the source code for $F_1$ changes, the application may be able to analyze the new version of $F_1$ without reperforming the analysis of $F_2$.

The compositional analysis program 108 may analyze elements of the source code in parallel. For example if a function $F_1$ invokes functions $F_2$ and $F_3$, the compositional analysis program 108 may analyze F2 and F3 in parallel, and then analyze $F_1$ using the stored summaries for $F_2$ and $F_3$. Such parallelization may be unachievable using a top-down technique.

The compositional analysis program 108 may also leverage stored summaries to perform compositional analysis on version sets. For example, compositional analysis might be performed on a version $V_1$ of a program comprising source code files, and on version $V_2$ of the same program, comprising different versions of those files. The compositional analysis program 108 is able to do this efficiently by reusing summaries for elements of the code that are unchanged between versions, and only redoing the analysis on changed portions of the code.

Figure 2:
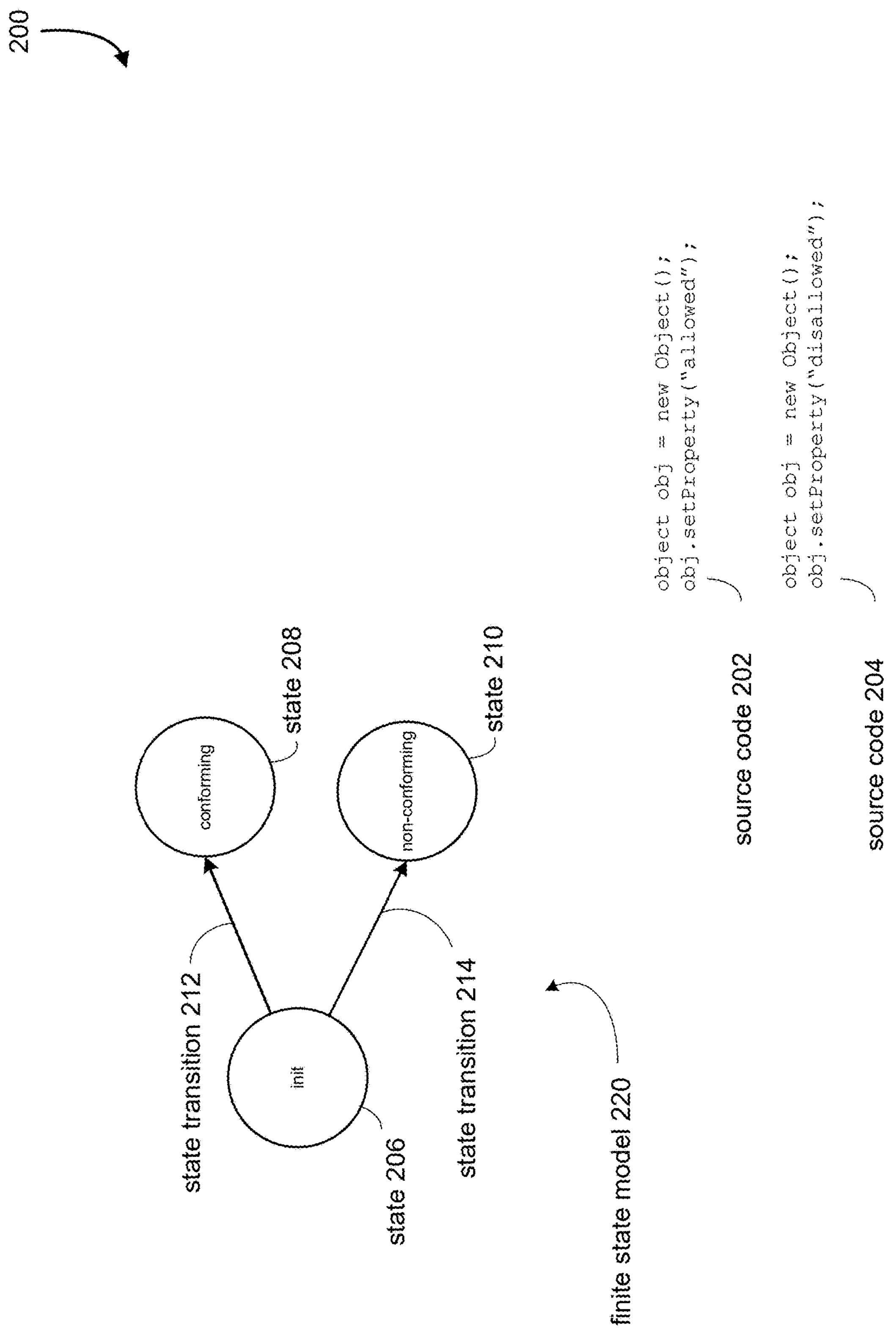
FIG. 2 illustrates application of a finite state model to source code, in accordance with at least one embodiment.

FIG. 2 illustrates application of a finite state model to source code, in accordance with at least one embodiment. In the example 200, a finite state model 220 is representative of rules for evaluating whether source code, such as the depicted source code 202 or source code 204, conforms to a programming policy that requires the Object.setProperty method to be called with the parameter "allowed," and prohibits other parameter values such as "disallowed."

In an example of applying this finite state model 220, the model 220 may be applied to source code 202. The finite state model 220 may be set to an initial state 206. This may be done, in at least one embodiment, by parsing the source code 202 and initializing the finite state model 220 when an instance of Object is created, or alternatively when the call to Object.setProperty is detected in code. The programming policies may indicate when a finite state model should be instantiated and initialized, as well as define the conditions that would cause state transitions 212, 214. For the example source code 202, the Object.setProperty method is called with a parameter value of "allowed," which would, when detected, result in the finite state model 220 transitioning to the conforming state 208 via state transition 212.

Analysis of a different fragment of source code 204 may proceed similarly. The finite state model 220 may be initialized to the init state 206, and then transition to the non-conforming state 210, via state transition 214, when the call to setProperty with the value "disallowed" is identified. The same transition could occur for any value other than "allowed," given that example 200 assumes that the programming policy precludes any other value than "allowed."

Figure 3:
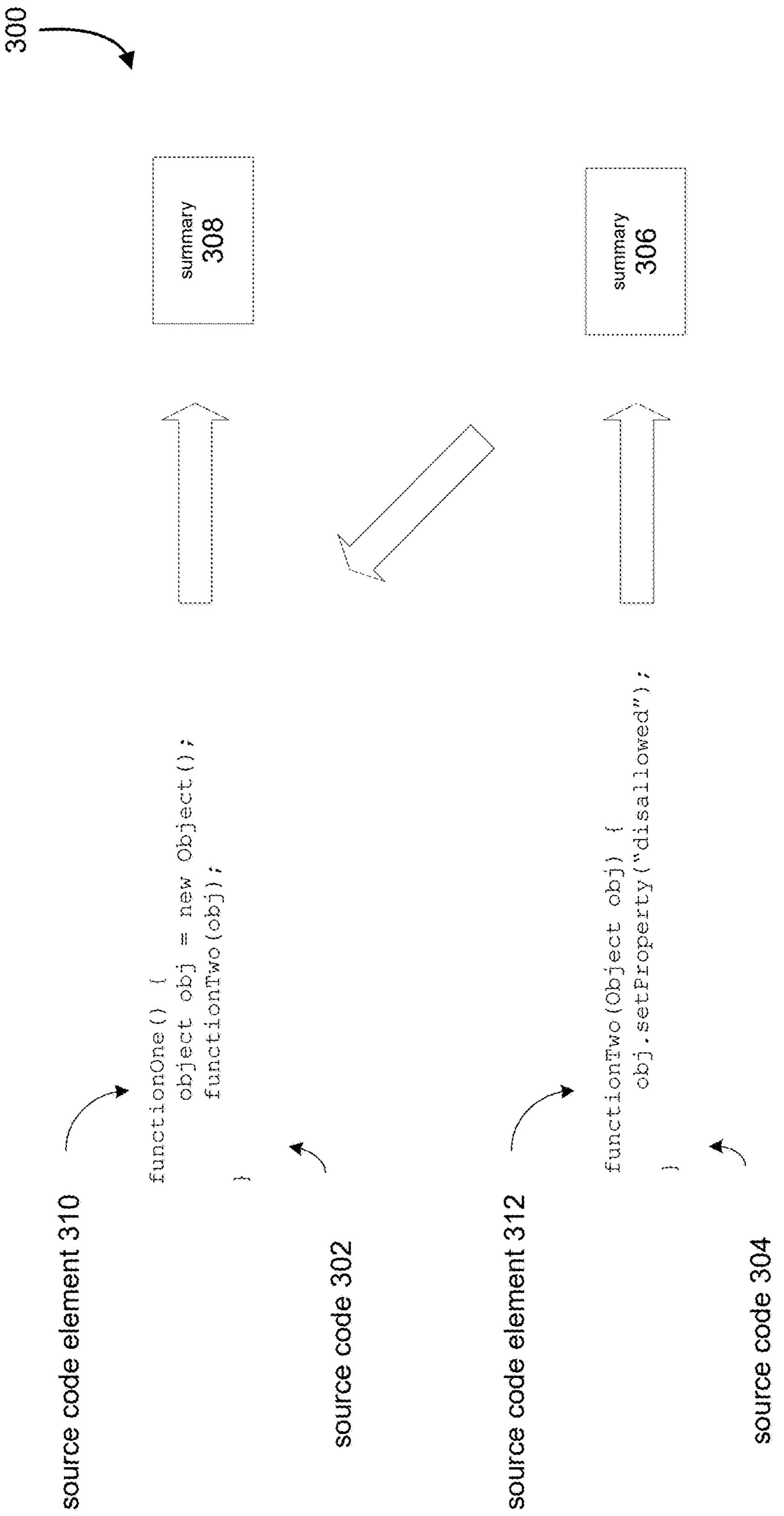
FIG. 3 illustrates compositional analysis of source code, in accordance with at least one embodiment.

FIG. 3 illustrates compositional analysis of source code, in accordance with at least one embodiment. In the example 300, source code 302 defines a function, "functionOne," that invokes a second function, "functionTwo," defined by source code 304. The functions functionOne and functionTwo may be referred to as source code elements 310, 312. A source code element can include functions or, equivalently, methods, procedures, or subroutines. A source code element can also include other units of source code, including but not limited to declarations and implementations, related or dependent blocks of code, and related or dependent source code files.

For the illustrative purposes of the example 300, the source code element 312 functionTwo calls "setProperty" with a value that would be found to be non-conforming in view of the programming policy and finite state model described in relation to FIG. 2. The source code element 310 functionOne does not itself contain anything contrary to the programming policy, but calls functionTwo. It may therefore be indicated to flag functionOne as being in violation of the policy.

A call tree, or call graph, comprising functionOne and functionTwo may be analyzed for compliance with a programming policy, by applying corresponding finite state models. For the purpose of the example 300, the finite state model described in relation to FIG. 2 is used. Embodiments may, using techniques similar or identical to those discussed herein, analyze a call graph comprising an entire program, using a plurality of programming policies and finite state models.

Using compositional analysis, functionTwo is analyzed first, in view of it being lower in the call graph than functionOne. Application of the finite state model depicted in FIG. 2 would result in the determination that the call to setProperty in functionTwo is non-conforming. This information can then be persisted in a summary 306. The summary 306 may be stored on any suitable medium or using any suitable storage service. The summary 306 might contain information indicative of the end state of the finite state model following its application to the source code 304.

Moving up the call chain, functionOne is analyzed next. This analysis may be performed using the stored summary 306 to determine that nonconforming code is executed when functionTwo is called. Note that since functionOne does not contain a call to setProperty, the finite state model 220 is not initialized or applied to functionOne. However, other finite state models might be applied. For example, a finite state model might include rules for evaluating whether functionTwo is called with an initialized instance of an Object. A summary 308 of the analysis of functionOne might then be stored, a reused for other functions higher in the call chain. The summary 308 may include information obtained from other summaries, such as the summary 306 from the analysis of functionTwo.

FIG. 4 illustrates source code for compositional analysis, in accordance with at least one embodiment. In the example 400, the programming rules are to check that "when the parse method of a Builder object is called, the Builder is always configured with an instance of a Factory object in a good state."

Figure 5:
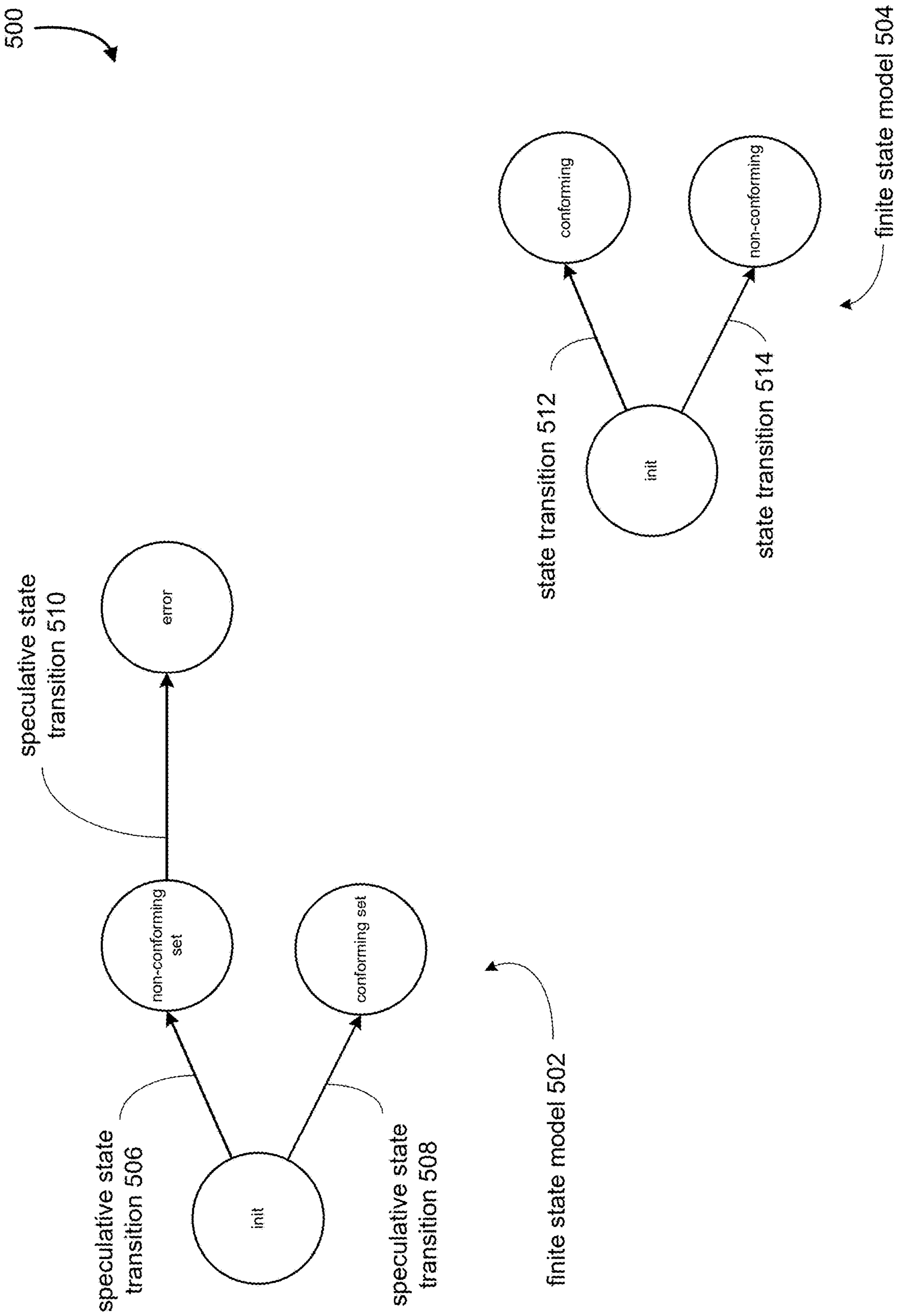
FIG. 5 illustrates compositional analysis of source code, in accordance with at least one embodiment.

The compositional analysis application analyzes the program bottom-up. It first summarizes functionTwo as defined in source code 402. Referring now also to the example 500 of FIG. 5, line 7 of source code 402 spawns the finite state model 502 and sets it to an initial state, corresponding to the initiation of a Builder object. However, at line 8, the compositional analysis application cannot determine if a state transition 514 to a "nonconforming state" or a state transition 512 to a "conforming state" should be triggered, as the state associated with the parameter "fac" to "build. SetFactory" is not yet known. Instead, the compositional analysis application generates two speculative state transitions 506, 508 that represent potential transitions to a "nonconforming state" and "conforming state," respectively. The nonconforming state 506 may be applicable if the Factory parameter fac that is passed to functionTwo is in a valid state, while the conforming state 508 may be applicable if the Factory parameter fac is in an invalid state. Then, at line 9, a speculative state transition 510 to an "error" state is identified based on the parse method of the Builder object being called with an instance of the Factor object in a bad state, thereby violating the programming policy.

The compositional analysis application then analyzes functionOne. At line 2, the finite state model 504 may be initialized, and at line 3 a concrete or non-speculative transition 514 to a nonconforming state is identified. The compositional analysis program then analyzes line 4 in view of the prior analysis of functionTwo, as stored in a summary. At this stage it is able to resolve the previously speculative state transitions 506, 510 to nonconforming and error.

Similarly, if the code at line 3 had initialized the Factor object "fac" to a valid state, analysis of line 4, in view of the prior analysis, could determine that the previously speculative state transition 508 to a conforming state is applicable, and consequently would find the code to be conforming.

Figure 6:
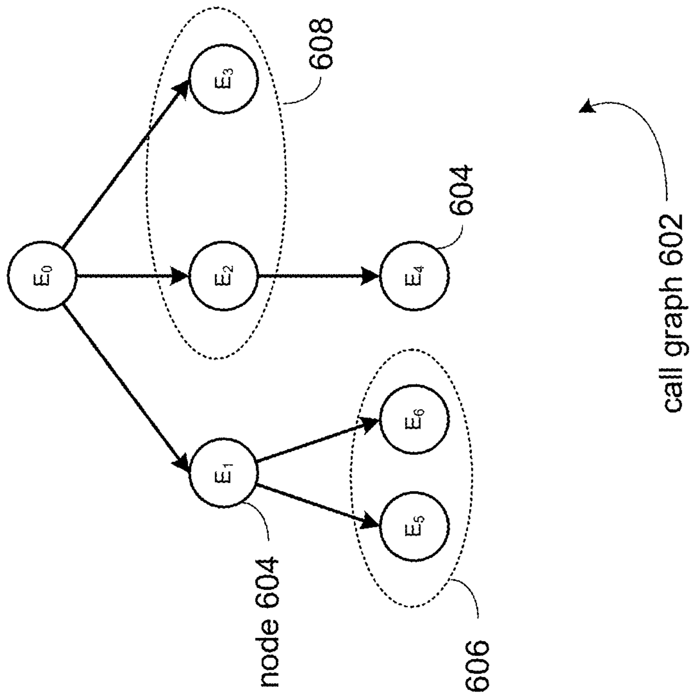
FIG. 6 illustrates parallelization of compositional analysis, in accordance with at least one embodiment.

FIG. 6 illustrates parallelization of compositional analysis, in accordance with at least one embodiment. In the example 600, a call graph 602 comprises nodes, such as the depicted nodes 604, that represent source code elements $E_0$-$E_6$. In the example call graph 602, a source code element $E_0$ is presumed, for the purpose of the example, to define the "main" function of a program, and to include calls or invocations of functions associated with source code elements $E_1$ to $E_3$. The function associated with $E_1$ calls functions associated with $E_5$ and $E_6$, and the function associated with $E_2$ calls a function associated with $E_4$. It will be appreciated that the example is intended to be illustrative rather than limiting. In general, a call tree refers to the relationships between elements of a program, and may be embodied in a variety of data structures, including trees or graphs comprises nodes linked by edges. A compositional analysis application may generate a call graph by parsing source code and identifying dependencies between the various elements.

To analyze the program represented by call graph 602 for conformance with a programming policy, a compositional analysis program can use parallelism techniques that may be impossible or impractical using top-down or non-compositional techniques. To take advantage of parallelism, the compositional analysis program may perform the analysis in a bottom-up or similar fashion. Source code elements lower in the call graph, or elements that don't have dependencies, may be processed in parallel. For example, the source code elements $E_5$ and $E_6$ could be processed in parallel, as depicted by the oval 606, or alternatively the source code elements $E_4$, $E_5$, and $E_6$ could be analyzed in parallel. Similarly, source code elements $E_2$ and $E_3$ could be processed in parallel as depicted by the oval 608, once $E_4$ has been analyzed and it's summary is available. Similarly, $E_1$, $E_2$, and $E_3$ could be analyzed in parallel if $E_4$, $E_5$, and $E_6$ have already been processed. The source code element $E_0$ associated with the root node of the call graph can be analyzed once $E_1$, $E_2$, and $E_3$ have been analyzed. Note that in some cases or embodiment the compositional analysis program may begin analyzing a source code dependency before all of its dependencies have been analyzed, but even in these case or embodiments, a compositional analysis will still generally proceed in bottom-up fashion and rely on stored summaries of elements lower in the call graph 602.

In at least one embodiment, portions of a call graph are analyzed and a summary of the analysis is stored and reused for subsequent analysis. For example, referring to FIG. 6, an analysis of nodes $E_1$, $E_5$, and $E_6$ may be stored as one summary and reused for the analysis of the node $E_0$. To further illustrate, it could be the case that $E_1$, $E_5$, and $E_6$ correspond to a library of functions that are referenced not only by $E_0$ but also by some other code not depicted in FIG. 6. A summary of $E_1$, $E_5$, and $E_6$ could be used to analyze both $E_0$ and this other code.

Figure 7:
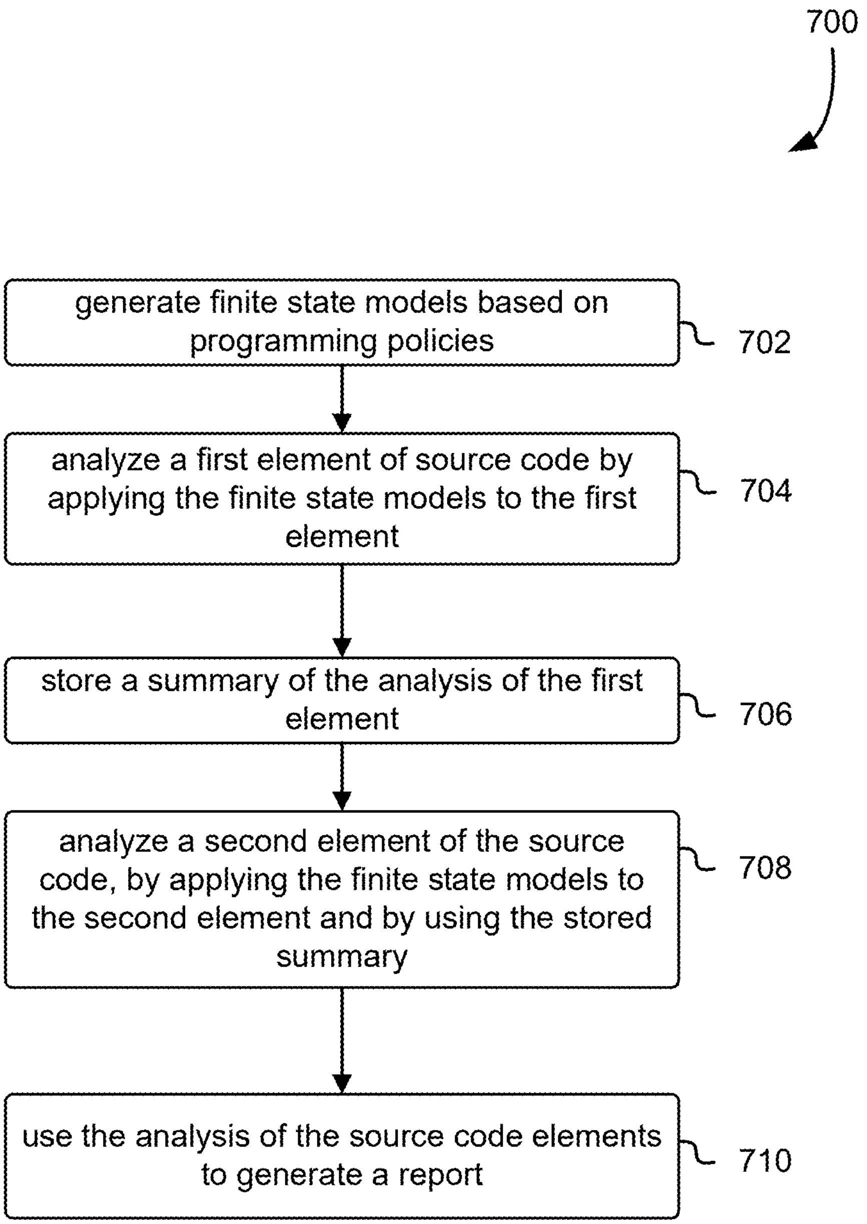
FIG. 7 illustrates an example process of compositional analysis, in accordance with at least one embodiment.

FIG. 7 illustrates an example process of compositional analysis, in accordance with at least one embodiment. Although the example process 700 of FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The following elements of FIG. 7 are described as being performed by a compositional analysis program. However, the example process 700 may be implemented by any suitable system, including but not necessarily limited to the system 100 depicted in FIG. 1.

At 702, the compositional analysis program generates finite state models based on programming policies. As explained herein, for example with respect to FIG. 1, a programming policy can comprise data that specifies various rules, tests, conditions, or guidelines for improving the quality of source code. These may be used to identify potential errors in the source code, as well as to check for other factors such as non-compliance with various standards or practices. The compositional analysis program may convert the policies to a set of finite state models, or similar data structures, that model the states and transitions associated with a particular rule or set of rules.

In at least one embodiment, the compositional analysis program generates the finite state models by parsing textual data in which the programming rules are defined.

In at least one embodiment, the finite state models are graph data structures representing a set of states and rules for transitioning between those states. The rules may be based on characteristics of the code to be analyzed, such as keywords or patterns that can be identified in the code by parsing or other similar or related techniques.

At 704, the compositional analysis program analyzes a first element of source code by applying the finite state models to the first element. As just noted, this can be done by identifying keywords or patterns in the code and triggering applicable state transitions in the finite state model. In some cases, state transitions are speculatively identified, as may be the case when a state transition is dependent upon a parameter whose value has not been specified. Examples of generating speculative states are described in relation to FIGS. 4 and 5.

At 706, the compositional analysis program stores a summary of the analysis of the first element. The summary may comprise information indicative of one or more finite state models and their respective current states. The information may also indicate speculative state transitions.

At 708, the compositional analysis program analyzes a second element of the source code, by applying the finite state models to the second element and by using the stored summary. This element can be one higher up in a call graph, such as a function that includes a reference to a function defined by the first element of the source code.

At 710, the compositional analysis program use the analysis of the source code elements to generate a report. The report includes information indicative of compliance with the programming policies used to generate the finite state models.

In a further example of an embodiment of the present disclosure, a computer-implemented method comprises generating one or more finite state models based, at least in part, on one or more programming policies; analyzing a first element of source code based, at least in part, on application of the one or more finite state models to the first element; storing a summary of the analysis of the first element; analyzing a second element of the source code, wherein the second element includes a reference to the first element, wherein the analysis of the second element is based, at least in part, on application of the one or more finite state models to the second element and the stored summary of the analysis of the first element; and generating a report indicative of conformance of the source code with the one or more programming policies, wherein the report is based, at least in part, on the first analysis and the second analysis.

In an aspect of this example, the one or more finite state models define rules for evaluating conformance of the source code with the one or more programming policies.

In an aspect of this example, the method further comprises analyzing a plurality of versions of the source code based, at least in part, on the stored summary of the analysis of the first element.

In an aspect of this example, the method further comprises receiving a modified version of the second element of the source code; and reusing the summary of the first analysis to analyze the modified version of the second element.

In another example, a system comprises at least one processor and a memory that stores computer-executable instructions that, in response to execution by the at least one processor, cause the system to at least perform operations to analyze source code. The system analyzes a first element of source code based, at least in part, on application of one or more finite state models to the first element, the one or more finite state models based at least in part on one or more programming policies; stores a summary of the analysis of the first element; analyzes a second element of the source code, wherein the second element includes a reference to the first element, wherein the analysis of the second element is based, at least in part, on application of the one or more finite state models to the second element and the stored summary of the analysis of the first element; and generates an indication of conformance of the source code with the one or more programming policies, wherein the indication of conformance is based, at least in part, on the analysis of the first and second elements.

In an aspect of this example, the one or more finite state models comprise information indicative of two or more states and rules for transitioning between the two or more states.

In an aspect of this example, the summary comprises information indicative of one or more states of the finite state model.

In an aspect of this example, the first analysis partially determines conformance of the first element of the source code with the one or more programming policies, and the second analysis comprises completing the determination based, at least in part on the partial determination.

In an aspect of this example, the memory stores computer-executable instructions that, in response to execution by the at least one processor, cause the system to at least receive a modified version of the second element of the source code; and use the summary of the first analysis to analyze the modified version of the second element.

In an aspect of the example, the memory stores computer-executable instructions that, in response to execution by the at least one processor, cause the system to at least analyze, in parallel, a plurality of elements of the source code based, at least in part, on application of one or more finite state models to the plurality of elements; and analyze the second element of the source code based, at least in part, on the parallel analysis of the plurality of elements.

In an aspect of this example, the first element of the source code corresponds to a definition of a function, and wherein the reference to the first element in the second element of the source code corresponds to source code to invoke the function.

In an aspect of this example, the stored summary comprises information indicative of one or more speculative state transitions of the finite state model.

In another example, a non-transitory computer-readable storage medium storing thereon executable instructions that, as a result of being executed by one or more processors of a computer system, cause the computer system to at least analyze a first element of source code using one or more finite state models, the one or more finite state models based at least in part on one or more programming policies; store a summary of the analysis of the first element; analyze a second element of the source code using the one or more finite state models, wherein the second element includes a reference to the first element, wherein the analysis of the second element is based, at least in part, on the stored summary of the analysis of the first element; and indicate conformance of the source code with the one or more programming policies, wherein the indication is based, at least in part, on the analysis of the first and second elements.

In an aspect of this example, the non-transitory computer-readable storage medium of claim 13, wherein the one or more finite state models comprise rules for evaluating source code with respect to the one or more programming policies.

In an aspect of this example, the non-transitory computer-readable storage medium the summary comprises information indicative of one or more states of the finite state model.

In an aspect of this example, the non-transitory computer-readable storage medium further comprise instructions that, as a result of being executed by the one or more processors, cause the computer system to partially determine conformance of the first element of the source code with the one or more programming policies; and complete the determination of conformance based, at least in part on the partial determination.

In an aspect of this example, the non-transitory computer-readable storage medium further comprise instructions that, as a result of being executed by the one or more processors, cause the computer system to analyze a modified version of the second element using the summary of the first analysis.

In an aspect of this example, the non-transitory computer-readable storage medium further comprise instructions that, as a result of being executed by the one or more processors, cause the computer system to analyze, in parallel, a plurality of elements of the source code based, at least in part, on application of one or more finite state models to the plurality of elements; and analyze the second element of the source code based, at least in part, on the parallel analysis of the plurality of elements.

In an aspect of this example, the first element of the source code corresponds to a definition of a function, and wherein the reference to the first element in the second element of the source code corresponds to source code to invoke the function.

In an aspect of this example, the stored summary comprises information indicative of compliance of a function with the one or more programming policies.

In an aspect of this example, the indication of conformance of the source code is based, at least in part, on analysis of one or more additional elements of source code, the one or more additional elements of source code analyzed by one or more other computing systems. For example, referring now to FIG. 6, elements of the call graph 602 may be analyzed on different computing devices to generate summaries of subsets of the call graph 602, and the summaries transmitted to another computing device to complete the analysis.

As one skilled in the art will appreciate in light of this disclosure, certain embodiments may be capable of achieving certain advantages, including one or more of the following. Certain embodiments may improve source code analysis through greater efficiency obtained via reuse of stored summary information. Certain embodiments may improve source code analysis through greater efficiency obtained via leveraging of parallelism. Certain embodiments may improve source code analysis by enabling analysis of version sets or large code bases in which elements are frequently modified.

Figure 8:
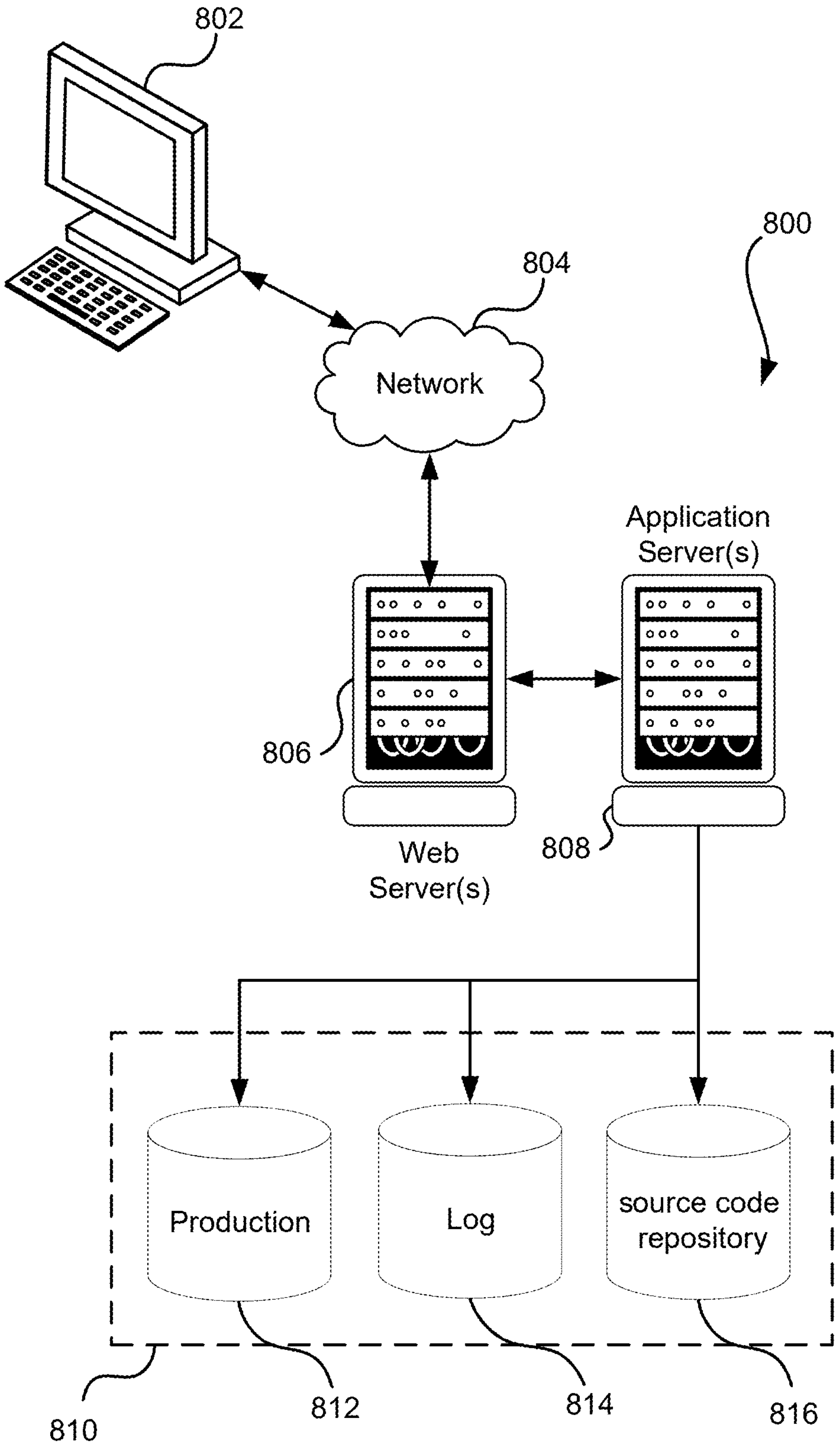
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The data store 810 may, in at least one embodiment, contain a source code repository 816 to store and retrieve source code on behalf of users of an electronic client device 802, by applications running on application server(s) 808, or by other systems. For example, programmers may use the electronic client device 802 to utilize an integrated development environment which includes facilities for developing applications, potentially including a compositional analysis application. In another example, an application server 808 hosts a compositional analysis application and uses it to provide source-code compliance reports to users of the electronic client device 802.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

causing, using one or more computing devices, a compositional analysis application to execute one or more processor-executable functions of the application, execution of the one or more processor-executable functions to:

generate one or more finite state models based, at least in part, on one or more programming policies;

analyze a first element in source code based, at least in part, on application of the one or more finite state models to the first element;

store a summary of the analysis of the first element, the summary comprising data indicative of a complete or partially complete analysis of the first element, including information describing one or more states of the one or more finite state models;

analyze a second element in the source code, wherein the second element has a dependency on the first element, and wherein the analysis of the second element is performed after analyzing the first element and is based, at least in part, on application of the one or more finite state models to the second element and the stored summary of the analysis of the first element;

analyze a modified version of the second element in the source code based, at least in part, on application of the one or more finite state models to the modified version of the second element and the stored summary of the analysis of the first element; and indicate conformance of the source code based, at least in part, on analyzing the first element and the modified second element.

2. The computer-implemented method of claim 1, wherein the one or more finite state models define rules for evaluating conformance of the source code with the one or more programming policies, and wherein the first element is lower in a call chain in the source code than the second element.

3. The computer-implemented method of claim 1, wherein execution of the one or more processor-executable functions is further to:

generate a report indicative of conformance of the source code with the one or more programming policies, wherein the report is based, at least in part, on analyzing the first element and the modified second element.

4. The computer-implemented method of claim 1, wherein execution of the one or more processor-executable functions is further to:

receive the modified second element of the source code.

5. A system, comprising:

at least one processor; and memory that stores computer-executable instructions of a compositional analysis application that, in response to execution by the at least one processor, cause the compositional analysis application to at least:

analyze a first element in source code based, at least in part, on application of one or more finite state models to the first element, the one or more finite state models based at least in part on one or more programming policies;

store a summary of the analysis of the first element, the summary comprising data that describes a complete or partially complete analysis of the first element;

analyze a second element in the source code, wherein the second element has a dependency on the first element, and wherein the analysis of the second element is performed after analyzing the first element and is based, at least in part, on application of the one or more finite state models to the second element and the stored summary of the analysis of the first element;

analyze a modified version of the second element in the source code based, at least in part, on application of the one or more finite state models to the modified version of the second element and the stored summary of the analysis of the first element; and indicate conformance of the source code based, at least in part, on analyzing the first element and the modified second element.

6. The system of claim 5, wherein the one or more finite state models comprise information indicative of two or more states and rules for transitioning between the two or more states.

7. The system of claim 5, wherein the summary further comprises at least one of information indicative of one or more states of the finite state model or information indicative of a call graph of the first element in the source code.

8. The system of claim 5, wherein analyzing the first element partially determines conformance of the first element in the source code with the one or more programming policies, and wherein analyzing the modified second element comprises completing the determination based, at least in part on the partial determination.

9. The system of claim 5, wherein the memory stores computer-executable instructions that, in response to execution by the at least one processor, cause the system to at least:

receive the modified second element in the source code.

10. The system of claim 5, wherein the memory stores computer-executable instructions that, in response to execution by the at least one processor, cause the system to at least:

analyze, in parallel, a plurality of elements in the source code based, at least in part, on application of the one or more finite state models to the plurality of elements; and analyze the modified second element in the source code based, at least in part, on the parallel analysis of the plurality of elements.

11. The system of claim 5, wherein the first element in the source code corresponds to a definition of a function, and wherein the dependency on the first element corresponds to source code to invoke the function.

12. The system of claim 5, wherein the stored summary further comprises information indicative of one or more speculative state transitions of the finite state model.

13. A non-transitory computer-readable storage medium storing thereon executable instructions of a compositional analysis application that, as a result of being executed by one or more processors of a computer system, cause the compositional analysis application to at least:

analyze a first element in source code using one or more finite state models, the one or more finite state models based at least in part on one or more programming policies;

store a summary of the analysis of the first element, the summary comprising data that describes a complete or partially complete analysis of the first element;

analyze a second element in the source code using the one or more finite state models, wherein the second element has a dependency on the first element, and wherein the analysis of the second element is performed after analyzing the first element and is based, at least in part, on the stored summary of the analysis of the first element;

analyze a modified version of the second element in the source code based, at least in part, on using of the one or more finite state models to analyze the modified version of the second element and the stored summary of the analysis of the first element; and indicate conformance of the source code based, at least in part, on analyzing the first element and the modified second element.

14. The non-transitory computer-readable storage medium of claim 13, wherein the instructions further comprise instructions that, as a result of being executed by the one or more processors, cause the compositional analysis application to further indicate the conformance of the source code with the one or more programming policies.

15. The non-transitory computer-readable storage medium of claim 13, wherein the summary further comprises information indicative of one or more states of the finite state model.

16. The non-transitory computer-readable storage medium of claim 13, wherein the instructions further comprise instructions that, as a result of being executed by the one or more processors, cause the compositional analysis application to:

partially determine conformance of the first element in the source code with the one or more programming policies; and complete the determination of conformance based, at least in part on the partial determination.

17. The non-transitory computer-readable storage medium of claim 13, wherein the instructions further comprise instructions that, as a result of being executed by the one or more processors, cause the compositional analysis application to:

analyze, in parallel, a plurality of elements in the source code based, at least in part, on application of the one or more finite state models to the plurality of elements; and analyze the modified second element in the source code based, at least in part, on the parallel analysis of the plurality of elements.

18. The non-transitory computer-readable storage medium of claim 13, wherein the first element in the source code corresponds to a definition of a function, and wherein the dependency on the first element corresponds to source code to invoke the function.

19. The non-transitory computer-readable storage medium of claim 13, wherein the stored summary further comprises information indicative of compliance of a function with the one or more programming policies.

* * * * *